Dec. 8, 1942.        L. V. BERGMANN         2,304,141
                      MOLDING MACHINE
              Filed May 27, 1938        3 Sheets-Sheet 1

Inventor
Leslie V. Bergmann
by
Walter & Kaufman
Attorney

Dec. 8, 1942.   L. V. BERGMANN   2,304,141
MOLDING MACHINE
Filed May 27, 1938   3 Sheets-Sheet 2

Inventor
Leslie V. Bergmann
by
Walter + Kaufman
Attorney

Patented Dec. 8, 1942

2,304,141

UNITED STATES PATENT OFFICE 2,304,141

MOLDING MACHINE

Leslie V. Bergmann, Lancaster Township, Lancaster County, Pa., assignor to Armstrong Cork Company, Lancaster, Pa., a corporation of Pennsylvania Application May 27, 1938, Serial No. 210,301

11 Claims. (Cl. 18—20)

This invention relates to a device for forming moldable compositions and is more particularly concerned with the art of rotary machines for molding plastic compositions.

One aspect of the invention contemplates a structure in which a series of molding members are actuated by liquid under pressure, said liquid pressure means being carried by the machine and rotatable therewith, whereby the individual molding members may be maintained under uniform working pressure, without the use of actuating valves. By the provision of a mechanically movable mold member adapted for cooperation with the fluid pressure actuated member, it is possible, by bringing the movable mold member to a predetermined position in cooperative molding relationship with respect to the element actuated by the liquid pressure means to develop a predetermined pressure on the molding composition disposed between the elements.

In another aspect, the invention contemplates a system in which the sequential operation of the mold elements to bring them into molding position and to part the elements to permit removal of completed articles and recharging of the mold elements is so predetermined that a substantially constant load is applied to the machine at all times during rotation.

Further, my invention contemplates a rotary molding machine, including liquid pressure actuating means for the mold elements and mechanical means for bringing the mold members into cooperative molding position, the mechanical means being arranged to permit momentary release of pressure between the mold elements during the curing cycle to permit the escape of entrapped gases.

Figure 2:
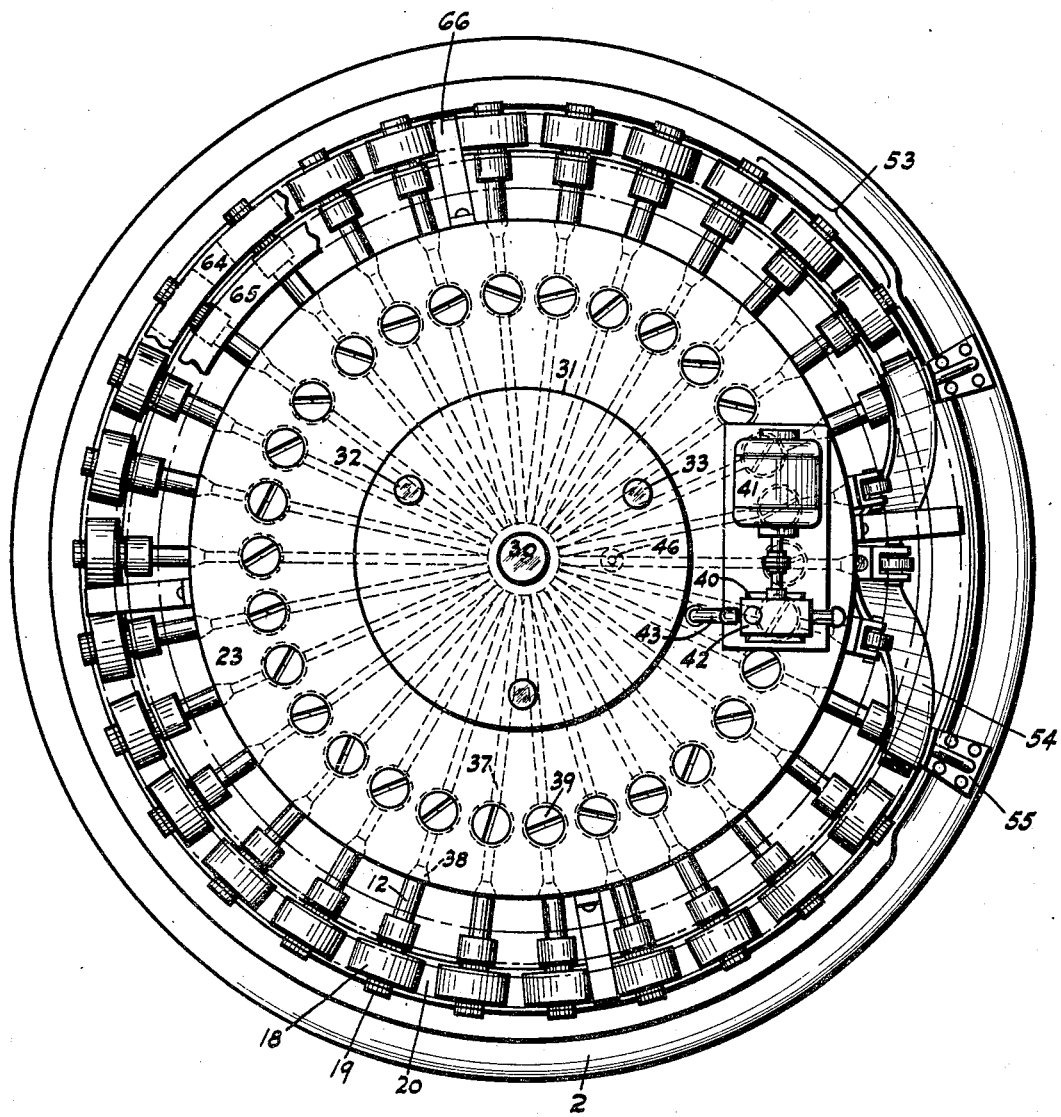
Figure 3:
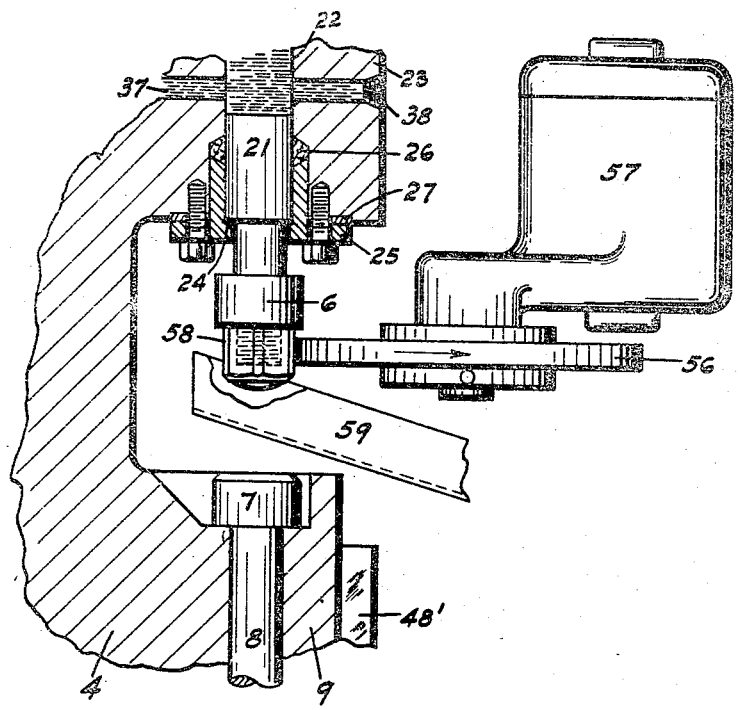
Figure 4:
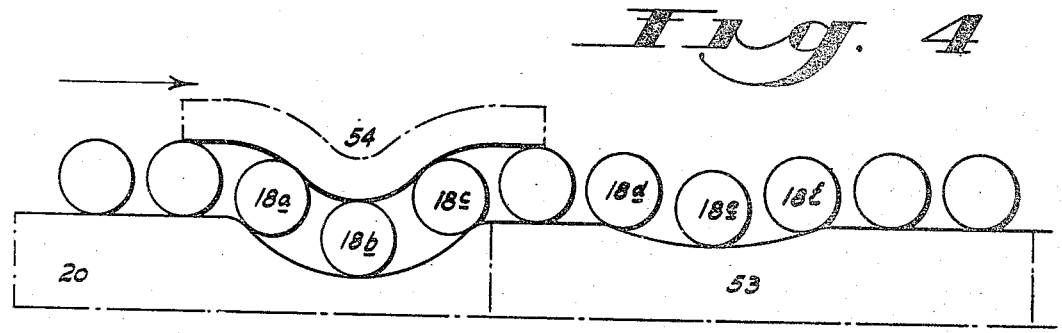

Other features of novelty will be more fully hereinafter explained in connection with the description of a preferred embodiment of my machine and its mode of operation. In the drawings Figure 1 is a somewhat diagrammatic view, partly in elevation and partly in section, showing a rotary, liquid pressure actuated molding machine embodying my invention, Figure 2 is a top plan view of the machine of Figure 1, with the parts shown in elevation in Figure 1, removed, Figure 3 is a detailed view of an unscrewing device suitable for use with my machine, and Figure 4 is a diagrammatic developed view illustrating a cam for imparting movement to the mold elements.

Figure 1:
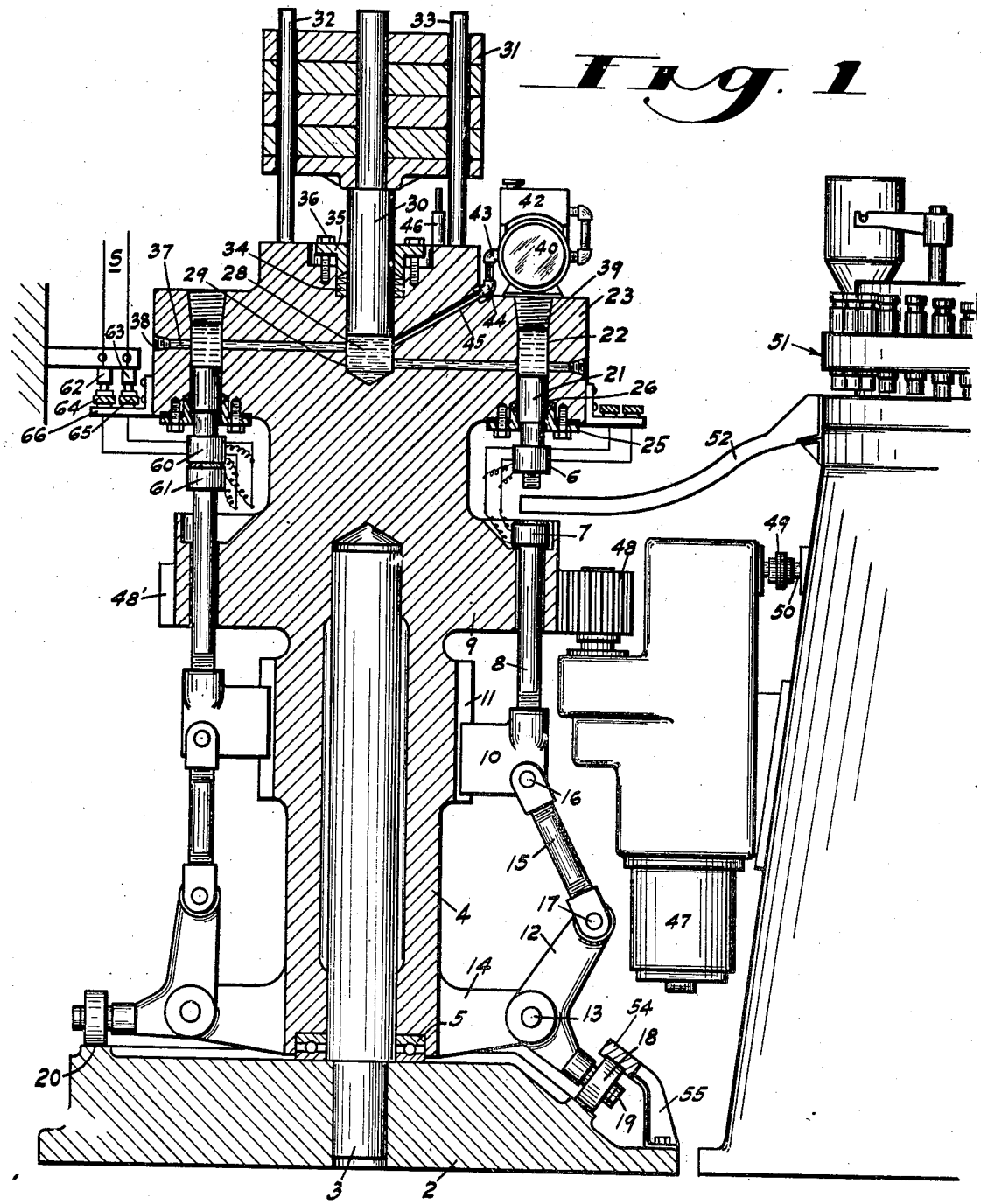

In Figure 1, two sets of mold members have been shown, the remainder being eliminated for sake of clarity. No unscrewing device has been shown in this figure for the same reason.

The molding device illustrated in the drawings is formed with a supporting base 2 in which is positioned a spindle 3, supporting a carrier 4 for rotation. A thrust ball bearing 5 is provided to reduce frictional wear between the spindle, carrier and base and to facilitate rotation of the carrier under pressure. A plurality of groups of cooperating mold elements 6 and 7 are mounted in spaced circumferential relationship upon the carrier 4 and rotate therewith.

Each of the elements 7, in the embodiment illustrated, is provided with a molding cavity and such elements are known as cavity or female mold elements. Each of the elements 6 is provided with an article forming projection and such elements are known as force plug or male mold elements. Each of the cavity elements 7 is carried by a plunger 8 which passes through a bearing opening provided in an outwardly directed radial extension 9 formed integral with the carrier. The plungers 8 are adjustable by threading into guide blocks 10 having bearing surfaces engageable with ways 11 formed on the carrier. The plungers 8 are adapted for vertical reciprocatory movement to bring the cavity elements 7 toward the force plug elements 6 and to separate or part the elements after completion of the molding cycle to permit removal of the completed elements and recharging with molding composition. This movement is imparted to each plunger 8 by a bell crank 12 pivoted at 13 to an arm 14 projecting radially outwardly from the carrier 4. The bell cranks 12 are connected to their respective guide blocks 10 by links 15 pivoted to the blocks at 16 and to the bell crank at 17, the bell crank and link forming a toggle joint at 17. The bell cranks 12 are rocked about the pivots 13 by engagement of cam wheels 18, affixed to gudgeons 19 formed on the leg of each bell crank 12 opposite the end of the leg to which the link 15 is pivoted, with a cam surface 20 formed on the base 2. The contouring of cam 20 is such that sufficient rocking movement is imparted to each bell crank 12 to move its associated cavity element 7 into cooperative molding position with respect to the complementary force plug element 6.

The force plug elements 6 are carried by pistons 21 operating in cylinders 22 formed in an outwardly directed radial extension 23 integral with the carrier 4. Each piston 21 is normally under liquid pressure and when the molds are in parted or open position, the plungers 21 lie in engagement with stops 24 formed as part of the packing glands 25 which hold packing material 26 in place to prevent leakage of the pressure fluid around the pistons 21 (Figure 3). In order to insure that the stop 24 which is integral with the gland 25 will be held in firm position with respect to the carrier 4 to inhibit wear and to provide convenient means for taking up the packing 26, a split shim 27 or shims (best shown in Figure 3) are provided between the gland 25 and the body of the web 23. These may be conveniently removed to compensate for wear of the packing and, when the gland is again drawn up, a firm connection with the carrier results.

A predetermined pressure is supplied uniformly to each of the pistons 21 by liquid 28 disposed within a pressure chamber 29 formed in the body of the carrier 4. A ram 30, weighted by weights 31, the weights being guided by guides 32 and 33, applies pressure to the fluid in the chamber 29. It is thus possible to control the pressure applied in molding to within extremely close limits and any change of pressure, such as might be necessitated when changing from one type of molding composition to another or when operating upon different sizes or shapes of pieces, may be conveniently effected by adding or removing weights 31. In the illustrated embodiment, the proportioning of the weights 31 and ram 30 and pistons 21 is somewhat diagrammatic for the sake of clarity of illustration.

To prevent leakage of the pressure liquid about the ram 30, packing 34 is provided which is held in place between the piston and the carrier body by a packing gland 35 secured to the carrier by bolts 36.

Liquid transfer passages 37 are provided to communicate liquid under pressure from the main chamber 29 to each of the cylinders 22. The passages 37 are formed by drilling from the outside of the extension 23 and the passages preferably enter the chamber 29 in non-uniform planes to avoid weakening the wall of the chamber 29. The entrance openings are closed by threaded tapered plugs 38. The cylinder bores 22 are formed by drilling or boring from the top of the carrier and they are likewise closed by removable tapered plugs 39.

The liquid pressure actuating mechanism, as above described, is mounted on the carrier for rotation therewith and is effective for continuously applying a predetermined pressure uniformly to each of the pistons 21, thus eliminating all rotary valve elements and accessory equipment which have been found expensive to manufacture and costly to maintain and which result in an inflexible machine which cannot be conveniently adjusted for the variable conditions encountered in molding plastics.

In order to maintain a constant volume of pressure liquid in the system to compensate for any slight leakage which might occur, a pump 40 is mounted on the top of the carrier 4 and is operated by a motor 41. The pump 40 is effective for supplying liquid from a tank 42 mounted in a saddle over the pump, through a pipe 43, a check valve 44 and a passageway 45 formed in the carrier 4 to the chamber 29. Any suitable liquid volume switch may be provided to automatically control the operation of the pump or it may be manually controlled if desired. As shown in Figure 1, an electric switch 46 is mounted on the carrier 4 in the path of downward travel of the weights 31 and is effective for connecting the motor 41 to a source of electric energy when the ram 30 recedes to a predetermined position and for disconnecting the motor from said source when the volume of liquid is sufficient to cause the ram to rise above a predetermined level.

Rotation is imparted to the carrier 4 by means of a unitary geared head motor 47 having a gear 48 engageable with a ring gear 48' secured to the radial extension 9 of the carrier 4. In the embodiment illustrated the motor unit 47 also includes a driving shaft secured through a coupling 49 to a shaft 50 effective for operating a preforming device generally indicated by the numeral 51. This device forms tablets or "pills" from molding powder and discharges the same into a chute 52 which directs them individually into the cavity elements 7 as they rotate. The preforming device has been shown diagrammatically and without concern to the details of its structure. Any suitable preforming device or hopper feed for preforms may be used which may be synchronized with the operation of the molding machine. If desired, powder may be charged directly into the cavities without the step of preforming.

However, by synchronizing the operation of the preforming device with the operation of the molding machine it is possible to avoid waste of expensive molding compositions since only sufficient preforms need be made to supply the machine during the time it is in operation. Another advantage of preforming is that the pills may be in heated condition when supplied to the cavities and thus the heating cycle for curing the composition may be reduced, effecting the attainment of higher speeds of operation. Also, by combining the preforming and preheating operations in one device, an independent preheating step in the manufacture of articles is eliminated.

In the operation of the machine, a charge of molding composition is fed to each cavity 7 while the elements 6 and 7 are parted as shown in the right-hand portion Figure 1. The operation of a single set of mold members will be described, it being understood that the same steps are carried out sequentially with the various mold members as the machine rotates. As the carrier 4 rotates about the base 2, the cam roller 18 which lies in engagement with the cam surface 20 formed on the base is caused to rise, thus imparting a rocking movement in a counter-clockwise direction to bell crank 12 which is pivoted at 13. There is thus imparted concomitantly a vertical movement in an upward direction to the plunger 8, through the link 15. By the toggle action provided, it is possible to easily apply great force between the mold members induced by the fluid pressure piston 21. The vertical upward movement of the plunger 8 is so predetermined that the cavity and force plug elements 6 and 7 are brought into cooperative molding relationship with the molding composition disposed therebetween, and the piston 21 is elevated away from the stop 24 so that the total force of pressure fluid in the cylinder 22 is applied to the molding composition. If preforms be used, they are generally of cylindrical or spherical shape and do not conform exactly to the configuration of the mold and as the plunger 8 brings the preform into engagement with the force plug element 6, the piston 21 is elevated. As the molding composition is broken down, it becomes more dense under pressure and conforms to the mold members and the piston 21 moves downwardly in compensation for the volumetric change and conformation of the molding composition. By applicant's construction, the pressure applied during this cycle remains constant regardless of the position of the piston 21 in the cylinder 22 for the force available is not increased or diminished by movement of the pistons 21, any change in the position of the pistons 21 resulting only in movement of the master ram 30 which compensates for the total volumetric change of all cylinder areas 22. When the molding composition has been caused to assume the shape of the molding elements, the piston 21 will be spaced a slight distance from the stop 24. This position can be conveniently predetermined and the machine adjusted accordingly to insure that the composition will be under molding pressure throughout the curing cycle. This avoids any major change in fluid displacement which would induce a major movement of the master piston 30.

As rotation continues, the roller 18 follows the cam surface 20 and, if thermo-setting molding composition be employed, it is desirable to release the pressure momentarily in order to permit the escape of entrapped air and gases between the molding elements which might otherwise result in blisters being formed in the article. This release of air and gases, or "breathing" as it is commonly called, is desirable particularly when powder charges are fed to the mold members. When operating upon preforms, most of the air entrapped in the powder is dispelled in the preforming operation, but, if the composition has a tendency to evolve gas during curing, the step of preforming will not totally eliminate such problem although it may be minimized by preheating during or subsequent to preforming. The release of gases may be conveniently effected by contouring the cam 20 in the area 53 so as to permit movement of the plunger 8 downwardly a distance sufficient to cause the piston 21 to engage the stop 24, thus releasing sufficient pressure from the article being molded to permit such "breathing" (Figures 2 and 4).

After completion of the molding cycle, the mold elements 6 and 7 are separated by imparting a rocking movement to the bell crank 12 in a clockwise direction. The cam 20 is provided with a shroud 54 secured to the base 2 by means of brackets 55, which shroud insures proper movement of the cam rollers 18 to positively separate the mold elements, overcoming any tendency for the molds not to part by reason of the adhesion with the formed article. If the molded piece adheres to the force plug, the cavity 7 is in position to receive a fresh charge of molding composition. This may be effected immediately after parting of the mold elements or subsequently after the molded piece has been removed from the force plug.

The molded element is ejected from the molds by any suitable mechanism. If the shape of the molded element permits, it may be ejected by a plunger type ejector of conventional form or if the element adheres to the force plug 6, as in the embodiment illustrated where a screw threaded closure is molded and the element adheres to the force plug 6, and must be unscrewed, the device shown in Figure 3 will be effective for removing the element from the force plug 6. This device comprises an unscrewing wheel 56 formed of rubber or other frictional material which is not deleteriously affected by heat. Rotation is imparted to the wheel 56 in the direction of the arrow by a geared motor 57. To aid in this unscrewing operation, the carrier 4 should rotate in a direction opposed to the direction of rotation of the wheel. The unscrewing wheel 56 is normally positioned in the path of the molded pieces 58 and is continuously rotated. As the pieces 58 on the force plugs 6 engage the surface of wheel 56 during rotation of the machine, rotation is imparted thereto which unscrews the same from the plugs and discharges them into a chute 59.

To insure a substantially constant total volume in the chambers 21 to obviate the possibility of any major movement of the ram 30 due to an extensive change in the total volume of pressure liquid in the chambers 22, the cam 20 is so contoured, as shown diagrammatically in Figure 4, that when pressure is being released between one set of mold members and its corresponding piston 21 is moving downwardly, pressure is being applied to another set of mold members and its corresponding piston 21 is moving upwardly. Thus, the volume change, if any, in the total area of the cylinders 22 is slight. Referring to Figure 4, it will be noted that cam roller 18a is entering a depressed portion of the cam 20 to effect opening or parting of the corresponding mold members actuated by the bell crank mechanism to which roller 18a is secured. The machine is shown as rotating in the direction of the arrow in Figure 4. Roller 18b is at the lowermost position and its corresponding mold is completely parted. Roller 18c is ascending to close the mold members. If a longer period of time for discharging completed articles from the molds and for recharging the molds with molding composition is required, the cam 20 may be contoured to provide that two or more molds will always be in open position, and one mold in the process of opening while another mold is in the process of closing. This insures a minimum volume change, as in the embodiment diagrammatically illustrated.

To obtain the same result during the breathing cycle, the cam 53 is similarly contoured. As shown in Figure 4, roller 18d is descending, roller 18e is in lowered or breathing position and roller 18f is ascending the cam. In order to permit changes in the position of the breathing cycle with respect to the closing of the mold members and to permit alteration of the duration thereof, the cam section 53 is preferably made removable as a unit as shown by the chain lines in Figure 4 to permit its ready removal and replacement with a differently contoured cam section.

The machine contemplated by this invention is usable either in hot molding or cold molding articles. If hot molding be carried out, it is necessary to provide suitable means for heating the molding elements 6 and 7. In the embodiment illustrated, electrical heating elements 60 and 61 are provided which encircle the elements 6 and 7, respectively. Current for energizing said heating elements is fed from a stationary source S through contacts 62 and 63, which are insulated from each other to spaced insulated slip rings 64 and 65 which are secured to the carrier 4 by brackets 66 circumferentially spaced to provide adequate support. Connecting wires pass from the slip ring 64 and 65 and communicate with pigtail connections from the heating elements to constantly supply current thereto. If the cold molding process is carried out, heating elements will not be necessary and consequently the electrical equipment will not be required. The slip rings are also utilized to supply current to the motor 41 for operating the pump 42.

Instead of separate heating units for each mold element, a pair of annular heating rings may be provided encircling the carrier in the zone of the mold elements, and the elements heated by conduction from the heating rings. This eliminates the problem of providing a multiplicity of electrical connections necessitated when a heating unit is provided for each element and it materially simplifies the manner in which the degree of heat may be thermostatically controlled.

From the foregoing description, it will be clear that in operation the mold members which are actuated by the liquid pressure pistons are normally urged toward their complementary mold members with a constant force and that the complementary mold members are moved to a predetermined position, such that the pressure of said liquid against the pistons applies the force directly and without variation to the molding composition disposed between the mold members; that all major movement of the mold members necessary to bring them into molding relationship and to effect parting to permit removal of formed articles and recharging of the molds is effected mechanically; and that release of gases is mechanically effected; all without the use of complicated liquid pressure valve mechanisms. The mechanism is thus materially simplified and maintenance problems as well as change over problems normally encountered when molding various articles with different compositions are minimized.

While I have illustrated and described certain specific preferred embodiments of my invention, it will be understood that the invention is not limited to the form shown and described but may be otherwise embodied and practiced within the scope of the following claims:

I claim:

1. In a molding machine, a supporting base, a carrier mounted for rotation with respect to said base, a pair of cooperating mold elements mounted on the carrier for rotation therewith in a closed path, a liquid pressure piston connected to one of said elements and movable within a cylinder bore, a source of liquid under pressure, including a liquid reservoir and a weighted ram for applying pressure to the liquid in the reservoir, said source being rotatable with said carrier, means communicating said liquid under pressure to said cylinder bore to apply force to said piston to urge the same into engagement with a limiting stop, said source, communicating means, and cylinder bore constituting a closed system in which said piston is movable without changing the fluid pressure loading thereon, a cam on said base, a bell crank and a link connected to said other element, a cam follower rotatable on the arm of said bell crank opposite the arm to which said link is connected, said cam follower being engageable with said cam, means for imparting rotation to said carrier to impart coincidental rotary motion to said bell crank with respect to said cam, said cam being so contoured as to rock said bell crank about its pivot point and effect a toggle action between the bell crank and link to impart movement to the mold member connected thereto to bring the same into predetermined position and into cooperative relationship with said liquid pressure loaded element to develop molding force therebetween and elevate said liquid pressure loaded element away from said stop.

2. A molding machine in accordance with claim 1 in which the cam is contoured so as to release the pressure developed between said mold elements after initial closing to permit the escape of entrapped gases in the article being molded.

3. In a rotary molding machine, a rotatable carrier; a plurality of pairs of complemental mold elements mounted on the carrier for rotation therewith; a liquid pressure piston connected to one of the mold elements of each of said pairs and movable within a cylinder bore; a source of liquid under pressure, including a liquid reservoir and a weighted ram for applying an unvarying pressure to liquid in the reservoir; means communicating said liquid under pressure to said cylinder bores to apply the force thereof continuously to said pistons, said source, communicating means, and cylinder bore constituting a closed system in which said pistons are movable without changing the fluid pressure loading thereon; and mechanical means connected to the second mold element of each of said pairs and operated by rotation of said carrier for sequentially moving said second mold elements to fixed positions and into closed cooperative relationship with their respective complemental fluid pressure loaded mold elements to develop molding force therebetween and for sequentially parting said elements in synchronism with the sequential closing thereof, to part one pair of complemental mold elements while another pair is closing, so that in rotation of the machine the volumetric change in the reservoir of pressure liquid is substantially nil.

4. In a rotary molding machine, a rotatable carrier; a plurality of pairs of complemental mold elements mounted on the carrier for rotation therewith; a liquid pressure piston connected to one of the mold elements of each of said pairs and movable within a cylinder bore; a source of liquid under pressure, including a liquid reservoir and a weighted ram for applying an unvarying pressure to the liquid in the reservoir; means communicating said liquid under pressure to said cylinder bores to apply the force thereof continuously to said pistons, said source, communicating means, and cylinder bores constituting a closed system in which said pistons are movable without changing the fluid pressure loading thereon; cam means stationary with respect to said rotatable carrier; and cam engaging means connected to the second mold element of each of said pairs, rotatable with the carrier, and engageable with said cam means for sequentially moving said second mold elements to fixed positions and into cooperative relationship with their respective complemental fluid pressure loaded mold elements and for sequentially parting one pair of said mold elements in synchronism with the sequential closing of another pair of mold elements.

5. In a rotary molding machine, a rotatable carrier; a plurality of pairs of complemental mold elements mounted on the carrier for rotation therewith; a liquid pressure piston connected to one of the mold elements of each of said pairs and movable within a cylinder bore; a source of liquid under unvarying pressure; means communicating said liquid under pressure to said cylinder bores to apply the force thereof continuously to said pistons, said pistons being movable in their cylinder bores without changing the fluid pressure loading thereon; cam means stationary with respect to said rotatable carrier; cam engaging means rotatable with the carrier; and toggles connecting said cam engaging means with said second mold elements of said pairs, said cam means and cam engaging means sequentially moving the second mold elements to a fixed position and into cooperative relationship with their respective complemental fluid pressure loaded mold elements, and means for sequentially parting one pair of said mold elements in synchronism with the sequential closing of another pair of mold elements upon rotation of the carrier.

6. A molding machine in accordance with claim 4 in which the cam means is contoured so as to release the pressure developed between said mold elements after initial closing to permit the escape of entrapped gases in the article being molded.

7. In a rotary molding machine, a rotatable carrier; a plurality of pairs of complemental mold elements mounted on the carrier for rotation therewith; a liquid pressure piston connected to one of the mold elements of each of said pairs and movable within a cylinder bore; a source of liquid under unvarying pressure rotatable with said carrier and communicating with said cylinder bore to apply force continuously to said pistons, said pistons being movable in their cylinder bores without changing the fluid pressure loading; stops limiting movement of said pistons normally urged by the fluid pressure loading; and mechanical means connected to the second mold element of each of said pairs and operated by rotation of said carrier for sequentially moving said second mold elements into fixed positions and into closed cooperative relationship with their respective complemental fluid pressure loaded mold elements, with said pistons out of engagement with their respective stops, and for sequentially parting said elements upon completion of the molding cycle in synchronism with the sequential closing thereof, to part one pair of complemental mold elements while another pair is closing so that in rotation of the machine the volumetric change in the reservoir of pressure liquid is substantially nil.

8. In a rotary molding machine, a rotatable carrier; a plurality of pairs of complemental mold elements mounted on the carrier for rotation therewith; a liquid pressure piston connected to one of the mold elements of said pairs and movable within a cylinder bore; a source of liquid under unvarying pressure; means for communicating said liquid under pressure to said cylinder bores to apply the force thereof continuously to said pistons, said pistons being movable in their cylinder bores without changing the fluid pressure loading thereon; cam means stationary with respect to said rotatable carrier; cam engaging means rotatable with the carrier; and toggles connecting said cam engaging means with the second of said mold elements of said pairs, said cam means and cam engaging means imparting movement sequentially to said toggles to move said second mold elements to a fixed position and into cooperative relationship with their respective complemental fluid pressure loaded mold elements.

9. In a rotary molding machine, a rotatable carrier; a plurality of pairs of complemental mold elements mounted on the carrier for rotation therewith; a liquid pressure piston connected to one of the mold elements of each of said pairs and movable within a cylinder bore; a source of liquid under pressure, including a liquid reservoir and a weighted ram for applying an unvarying pressure to the liquid in the reservoir; means communicating said liquid under pressure to said cylinder bores to apply the force thereof continuously to said pistons, said source, communicating means, and cylinder bores constituting a closed system in which said pistons are movable without changing the fluid pressure loading thereon; cam means stationary with respect to said rotatable carrier; and cam engaging means rotatable with the carrier and engageable with said cam means for sequentially moving said second mold elements to fixed positions and into cooperative relationship with their respective complemental fluid pressure loaded mold elements, for sequentially parting one pair of said mold elements in synchronism with the sequential closing of another pair of mold elements, and for sequentially parting a previously closed pair of mold elements to permit escape of entrapped gases in the article being molded in synchronism with sequential closing of another pair of mold elements previously parted to permit such escape, so that in rotation of the machine the volumetric change in the reservoir of pressure liquid is substantially nil.

10. In a rotary molding machine, a rotatable carrier; a plurality of pairs of complemental mold elements mounted on the carrier for rotation therewith; a liquid pressure piston connected to one of the mold elements of said pairs and movable within a cylinder bore; a source of liquid under unvarying pressure; means for communicating said liquid under pressure to said cylinder bores to apply the force thereof continuously to said pistons, said pistons being movable in their cylinder bores without changing the fluid pressure loading thereon; and mechanical means connected to the second mold element of each of said pairs for imparting movement sequentially to said second mold elements to bring the same to a fixed position and into cooperative relationship with their respective complemental fluid pressure loaded mold elements.

11. In a rotary molding machine, a rotatable carrier; a plurality of pairs of complemental mold elements mounted on the carrier for rotation therewith; a liquid pressure piston connected to one of the mold elements of said pairs and movable within a cylinder bore; a source of liquid under unvarying pressure; means for communicating said liquid under pressure to said cylinder bores to apply the force thereof continuously to said pistons, said pistons being movable in their cylinder bores without changing the fluid pressure loading thereon; and mechanical means connected to the second mold element of each of said pairs for imparting movement to said second mold elements to bring the same sequentially to a fixed position and into cooperative relationship with their respective complemental fluid pressure loaded mold elements and to sequentially part said elements in synchronism with the sequential closing thereof to maintain the hydraulic system in substantial balance.

LESLIE V. BERGMANN.